3,696,054
PAINT COMPOSITIONS

John Allen Saunders, Teddington, England, assignor to The Research Association of British Paint, Colour & Varnish Manufacturers, Teddington, England
No Drawing. Filed Apr. 13, 1970, Ser. No. 28,154
Claims priority, application Great Britain, Apr. 18, 1969, 20,041/69
Int. Cl. H01b 1/06; B44c 1/00; C01b 31/00
U.S. Cl. 252—511                    7 Claims

ABSTRACT OF THE DISCLOSURE

This invention discloses paint compositions and the preparation of paint compositions which can be spread and dried to give electrically conductive films. The paint compositions contain colloidal carbon particles. The graphite is wet ground and this is found to give a particular shape to the resulting particles and a particle size distribution such that the dried conductive films have a low resistivity in the range of about 0.1 to 10 ohms/square, Such films produce useful heat outputs when relatively low voltage currents are passed through them and so they are suitable for application to the walls of a building for use as a central heating system.

---

This invention relates to paint compositions and is particularly concerned with paint compositions and the preparation of such paint compositions which can form electrically conductive paint coatings.

BACKGROUND OF THE INVENTION

There have been many attempts to produce electrically conductive coatings and these have generally fallen into one of two types. One type has been formed from a paint having a pigmentation of metal particles while the other type has been formed from compositions containing carbon or graphite.

The paints having the pigmentation of metal particles give coatings having a very low resistivity and their purpose has been to provide conducting coatings having a high conductivity.

The mixtures containing carbon and graphite, on the other hand have had much higher resistivities.

Thus, when applied as thin layers, e.g. 0.001 to 0.005 inch in thickness, they have quite high resistivities e.g. 100 ohms per square or much more, while if applied as thicker coatings there would be problems of cracking of the films with the passage of time and these thicker coatings could not be applied in the simple way by painting.

There is a need for electrically conductive coatings which have a resistivity such that they can be used as heating elements, for example, when applied to the walls of a building. Thus, the paints having the pigmentation of metal particles would be completely unsuitable because of their high conductivity since excessively high currents would be required to give reasonable heat outputs. The mixtures containing carbon or graphite on the other hand have too high a resistivity and to give reasonable heat outputs they would require too high a voltage drop for safety. Thus, for use on the wall of a building the total voltage drop across the wall should not exceed the 40 volt limit defined as low voltage by the Institution of Electrical Engineers (United Kingdom).

It is, therefore, an object of this invention to provide a paint composition which has a paint-like consistency and so can readily be spread into the form of thin coatings and yet which has a low resistivity, e.g. from 0.1 to 10 ohms/square, so that thin coatings of it give a reasonable heat output at low voltages.

THE INVENTION

According to the invention there is provided a method of making an electrically conductive paint composition in which graphite is comminuted by wet grinding so as to reduce the graphite to thin platelets by laminar cleavage, and incorporating the graphite before, during or after grinding in an air-hardenable binder, the mixture of comminuted graphite and air-hardenable binder having a paint-like consistency and being capable of being brushed or sprayed so as to give a thin even film on a surface.

The invention also extends to the paint composition which has been made by this method and to the resulting electrically conductive coatings.

By making the paint composition in this way we have found that dried films formed from the composition can have quite low resistivities e.g. 0.1 to 10 ohms/square. In practice we find that thin films, e.g. 0.001 inch in thickness, can readily have a resistivity of less than 10 ohms per square and values of the order of 1 ohm per square can also be achieved. In fact a one foot square film having a resistivity of 1 ohm per square gives an output of 25 watts with a 5 volt supply. A larger area, say 8 feet square, gives the same output (i.e. 25 watts per square foot) with a 40 volt supply, this being probably the upper limit of voltage to meet safety requirements. The paint compositions of this invention are thus very suitable for use on interior building surfaces or other applications where heating of a large area is desirable without large voltage drops.

The actual resistivity of a dried film of a paint composition according to the invention depends upon the film thickness and paint films normally have thicknesses of from 0.001 to 0.005 inch. A normal thin film is about 0.001 inch (25 microns) to 0.0015 inch thick and this will be formed at a dry coating weight of about 50 to 60 g./m.$^2$. Thicker coatings can be prepared either by applying a thicker film e.g. 0.003 inch thick (75 microns) or by applying several thin films.

We do not know for certain why the invented paint compositions produce coatings having such low resistivities but we believe that this is because the graphite has been wet ground. This wet grinding of the graphite in wet suspension gives a different shape to the resulting ground graphite particles as compared with a dry grinding process and also a different particle size distribution. This wet grinding gives laminar cleavage of the graphite particles and gives a wide distribution of particle sizes and we believe that this results in a close packing of the ground particles in the dry film leading to low resistivity. Preferably the graphite should be of a type which will readily form flakes or platelets.

Another advantage of the invention is, we find, that films made from the invented paint composition can be heat cycled, that is repeated heating by passing a current through the films followed by a cooling period, without the film cracking whereas a film made by merely mixing a fine grade of carbon black and the same binder, tends to crack after only a very few cycles.

The graphite content of the paint compositions of the invention will determine the conductivity of films prepared from the composition in that as the amount of graphite is increased so is the conductivity. A balance must, however, be sought between achieving a high conductivity and a stable paint composition containing enough binder to give the required paint-like properties. Generally, therefore, the graphite to binder ratio should be from 0.33:1 to 4:1 as calculated by weight of the non-volatile material, or a pigment volume concentration (p.v.c.) of from 25 to 75%, and greater than 45% being preferred. Naturally the carbon content of the graphite also has an effect on the conductivity of the film and a high carbon content is preferred.

It is found that in practice the wet grinding of the graphite does not produce a noticeable amount of the very smallest particles, i.e., those of collodial size. Therefore according to a preferred feature of the present invention we incorporate collodial size carbon particles in the paint compositions at a convenient stage in the preparation of these paint compositions. This, we find, reduces even further the resistivity of coatings of the paint compositions of the invention.

Apart from this improvement in electrical properties, the resulting paint compositions have improved brushability, i.e. they can be spread more easily, and give smoother films.

Therefore, according to another aspect of the invention there is provided a paint composition comprising dispersed in an air-hardenable binder a total of from 25 to 75% p.v.c. of conductive particles of which from 14 to 70% p.v.c. are thin graphite platelets and from 2 to 35% p.v.c. are collodial carbon particles having a particle size of from 20 to 60 millimicrons as determined by electron microscopy, the composition having a paint-like consistency and being capable of being brushed or sprayed so as to give a thin even film of low electrical resistivity on a surface.

It is possible to use a colloidal carbon to graphite ratio of up to 0.8 by weight; preferably the ratio is from 0.1 to 0.5 by weight, a ratio of about 0.4 by weight giving optimum low resistivity in the dried paint films, and ratios of about 0.2 to 0.3 by weight giving optimum flow properties to the paint compositions. All of the graphite particles cannot, however, be replaced by the colloidal carbon particles because as noted above the resulting dried films are found to be unstable to repeated changes of temperature, e.g. as occurs when electric current is intermittently passed through the film.

The colloidal carbon particles will preferably have particle sizes of from 20 to 50 millimicrons as determined by electron microscopy. Suitable colloidal carbon particles are the colloidal particles produced by partial combustion such as the fine carbon black pigments available, for example, Vulcan XXX or Vulcan XC-72 of the Cabot Corporation and acetylene black, for example, the product sold by Shawinigan Chemicals Limited.

As described above the thin graphite platelets can be prepared by wet grinding. However, we fined that the considerable reduction in electrical resistivity of films made from paint compositions to which have been added colloidal carbon particles allows one initially to employ a graphite for wet grinding having a smaller particle size than without the addition of the collodial carbon particles. Naturally this reduces both the time and cost of the grinding operation and also avoids nibs, i.e. coarse particles in the final coating.

By the term "air-hardenable" binder we mean a binder which will set or harden to give a dry film when the paint composition is spread into a thin film in contact with air at ambient or elevated temperatures. This setting or hardening can be achieved in any suitable way, for example, by evaporation of solvents, reaction with oxygen or other components of the atmosphere, or reaction with other components in the paint composition.

The films formed from paint compositions of the invention can be used as a heat source by passing a current through them and so the binder should be stable to the temperatures reached by the film. A normal operating temperature for internal wall or ceiling surfaces would be 30 to 50° C. Typical suitable binders are inorganic binders such as an alkali metal silicate, e.g. potassium or sodium silicate, aqueous binders such as partially organic binders, e.g. silicates of quaternary organic bases, or totally organic binders, e.g. aqueous emulsion binders, and organic solvent soluble resin binders. The maximum operating temperature of the dried paint films depends upon the binder used. Thus, films made using silicate binders can be used up to 400° C. whereas films made using aqueous emulsion paint are limited to uses below 100° C.

If the films are to be used on the walls of buildings, it is desirable that they be non-flammable. This requirement is met by use of inorganic silicate binders.

The wet grinding of the graphite can be aided by the addition to the mixture of a surface active agent. Such agents improve film formation properties and ease of application of the resulting paint composition apart from increasing the efficiency of the grinding process so reducing the milling time required.

When aqueous alkali silicates are used as the binder, anionic, cationic and non-ionic agents surface active agents can be used. The preferred agent is, however, the sodium naphthalene sulphonic acid/formaldehyde condensate type (Dispersol T or Belloid TD), but this cannot be used when the paint is to be free of alkali metal ions, e.g. when an organic ammonium silicate is used. In such a case a non-ionic agent such as Lissapol NX (a nonyl phenyl ethylene oxide condensate) is preferred. This also improves the storage stability of the paint composition. In some silicate paints which tend to gel when they pick up ceramic wear products from milling equipment, the use of a cationic agent, e.g. a fatty amine/ethylene oxide condensate type (Ethomeen) improved their stability.

For use with some organic emulsion binders Dispersol T is not suitable since it may gel the emulsion; Lissapol NX can be used successfully instead. Organic solvent soluble polymeric binders in some cases function adequately for dispersion without the addition of a separate surface active agent but where necessary a Rosaniline base is suitable.

The paint compositions of the invention can be applied to surfaces in a similar way to ordinary paints, e.g. by brush, roller, spray or dipping.

The graphite must be we ground, that is to say the graphite must be ground in the form of a suspension in a liquid which can either be the binder itself or can be a liquid which is a solvent for, or compatible with, the binder, e.g. water. In the case of organic latex binders and some silicate binders it is better to mill the graphite, possibly together with the colloidal size carbon particles, in say a small amount of water and a dispersing agent and thereafter to add the binder to the resulting milled paste. In other cases, the graphite can be milled together with a small part of the binder and then the remaining major part added later to the resulting milled mixture while in other cases where colloidal size carbon particles are to be incorporated, these colloidal size particles can first be thoroughly milled with the binder followed by addition of the graphite and further milling. The best order of steps can in any particular case be found by experiment.

One excellent paint composition according to the invention can be prepared from a potassium silicate solution having a mole ratio of $SiO_2$ to $K_2O$ of about 4, fairly coarse flake graphite which is, of course, finely comminuted during the grinding, and an alkyl aryl sulphonate, e.g. Belloid TD or Dispersol T (disodium salt of methylene dinaphthalene sulphonic acid) as the surface active agent. Generally such a composition will also be diluted with water.

The manner in which electrodes are connected to films formed from the paint compositions of the invention is not critical provided that the resulting contact has a low level of contact resistance. In practice we have found that a particularly convenient method is to coat a surface with the invented composition, and then stick thin aluminium foils (say 0.0003" thick) along the opposite edges of the painted surface using a thin layer of the paint as the adhesive. Bus bars of say 18 B.G. aluminium strip can then be held against the foil along their length by screws or spring clips. With such an arrangement, we have found that it is possible to supply currents of the order of 3 to 6 amps per foot without any evidence of overheating of the contacts.

The paint compositions according to the invention are useful for many purposes where an electrically conductive film is required. They can be applied to walls of buildings, e.g. houses, flats, offices, factories, schools and hospitals, and an electric current passed through the resulting films to heat that building. Alternatively prefabricated heating panels with dried film of the paint on a variety of substrates, e.g. insulated steel, insulated aluminium, hardboard, chip board and wood, can be made either for incorporation into a building or as a free-standing panel. Such panels find wide domestic and industrial use, e.g. as special heating units in cars, trains and aircraft.

Besides use on wall panels of buildings, a film of the paint can be applied say to concrete, with an overlay of plastic sheet or floor tiles to give underfloor central heating.

Other uses envisaged for the dried electrically conductive paint films include, for example, heating animal stalls, hen-houses, poultry incubators, green-houses, propagating units for raising seedlings using separate heating panels or by painting the walls or floors of such units, the trace heating of pipelines where temperatures up to 200° C. could readily be achieved so as to prevent freezing or solidification, the coating of the walls of cathode ray tubes for electrostatic screening, or heating units for gases, e.g. convector type free-standing heaters.

PREFERRED EMBODIMENTS OF THE INVENTION

The invention will now be illustrated by the following examples:

EXAMPLE 1

A conductive paint composition was prepared by ball milling together the following components in the indicated parts by weight for a period of ten hours in a planetary mill:

Potassium silicate solution of 29.9% solids content,
  mole ratio $SiO_2/K_2O$ of 3.89 _____ 500
Madagascar Flake graphite ($\geq$85% C content) __ 222.5
Anionic wetting agent (Belloid TD) _____ 16.2
Water _____ 150

One coat of the resulting paint composition was applied by brushing to a rectangular asbestos panel measuring 18" x 20" and foil connections were applied using the technique described above. When dry, aluminium bus bars 1.25 inches wide and 20 inches long were clipped to the two longer edges of the panel using five retainers on each bus bar. The coating resistance of the whole panel was found to be 0.90 ohm, and passage of a current of 10 amps through the film produced an output of 36 watts per square foot with a maximum voltage gradient of 6 volts/foot.

A decorative silicate paint pigmented with yellow inorganic pigment was sprayed over the front of the conductive panel to provide an attractive appearance and this was found to make no substantial difference to the heating properties of the film.

No loss of film continuity occurred during a period of 16 months of daily use, the panel being heated for 7½ hours/day and switched on and off daily. Also no alteration of electrical properties took place during this period.

EXAMPLE 2

In order to compare various grades of graphite with one another, a number of paint compositions were prepared by planetary milling using as the binder potassium silicate solution (30% solids), and as the dispersing agent Belloid TD. A different type of graphite was incorporated in each composition as follows:

A _____ Average particle size 5μ.
B _____ 98% passing 300 mesh (53μ).
C _____ Flake material of 20 mesh BS.

In addition the proportion of graphite to binder was varied.

Each paint composition was then sprayed onto asbestos boards to give a dry coating weight of 0.00625 g./cm.$^2$ (about 0.001" thick film) and electrodes were attached as described above. Then once the films had dried, their resistivities were measured and the results are set out in the following table.

| Graphite to binder ratio (by weight) | Resistivity in ohms/square | | |
|---|---|---|---|
| | Graphite A | Graphite B | Graphite C |
| 1.33 | 29.1 | 3.3 | 1.7 |
| 1.00 | | 7.9 | 1.9 |
| 0.67 | 118.0 | 14.7 | 5.5 |
| 0.44 | | 40.2 | 26.0 |

As will be noted, the conductivity increased with increasing proportions of graphite. Also best results were achieved using the flake type of graphite. Naturally by applying a second coating of each composition one could have the resistivities of the films.

EXAMPLE 3

Two paint compositions (A and B) were prepared by milling together for eight hours on a planetary ball mill the following compositions in parts by weight:

| Paint | A | B |
|---|---|---|
| Potassium silicate solution (mole ratio $SiO_2/K_2O$ of 3.89, 29.9% solids) | 333.3 | 333.3 |
| Madagascar flake graphite (coarse, >85% carbon) | 200.0 | 181.8 |
| Carbon furnace black (Vulcan XC-72) | | 18.2 |
| Dispersing agent (Belloid TD) | 10.0 | 14.5 |
| Distilled water | 231.8 | 231.8 |

As can be seen Paint B contained about 10% of the total weight of carbon particles of a colloidal carbon furnace black and also an increased quantity of dispersing agent to assist dispersion of the colloidal particles.

Single brushed coates of each paint were then applied to sheets of plasterboard of dimensions 12" by 14", and when dried aluminium foil terminations of 1" width were attached to give a conductive coating area 12" x 12". The electrical resistivities were then measured, with the following results:

Ohms/per square
Paint A _____ 5.5
Paint B _____ 1.6

EXAMPLE 4

Two paints (C and D) having the following compositions in parts by weight:

| Paint | C | D |
|---|---|---|
| Potassium silicate solution (mole ratio of $SiO_2/K_2O$ of 3.89, 29.9% solids) | 333.3 | 333.3 |
| Ceylon graphite (<50 mesh powder 93-94% carbon) | 200.0 | 181.8 |
| Carbon furnace black (Vulcan XC-72) | | 18.2 |
| Dispersing agent (Belloid TD) | 14.5 | 14.5 |
| Distilled water | 231.8 | 231.8 | were prepared and tested as described in Example 3. The resulting dry coatings had the following resistivities:

Ohms/square
Paint C _____ 7.6
Paint D _____ 1.5

EXAMPLE 5

Two paints (E and F) having the following compositions in parts by weight:

| Paint | C | D |
|---|---|---|
| Sodium silicate solution (mole ratio SiO$_2$/Na$_2$O of 3.98, 28.0% solids) | 357.0 | 357.0 |
| Ceylon graphite (<50 mesh powder, 93.94% carbon) | 200.0 | 181.8 |
| Carbon furnace black (Vulcan XC-72) | | 18.2 |
| Dispersing agent (Dispersol T) | 14.5 | 14.5 |
| Distilled water | 208.0 | 208.0 | were prepared as described in Example 3. Each paint was diluted with 75 ml. of water before being discharged from the mill, and the resulting paints were tested as described in Example 3. The resulting dry coatings had the following resistivities:

|  | Ohms/square |
|---|---|
| Paint E | 4.7 |
| Paint F | 1.3 |

As can be seen from Examples 3 to 5, paints A, C and E give films having low resistivities, however, the paints B, D and F made by additionally incorporating colloidal size carbon particles gave films having even lower resistivities.

Lithium silicates and mixtures of lithium silicate with sodium silicate and possibly potassium silicate also form good binders for use in paint compositions according to the invention as demonstrated by the following Examples 6 and 7.

EXAMPLE 6

Two paints (G and H) having the following compositions in parts by weight:

| Paint | G | H |
|---|---|---|
| Lithium silicate solution (mole ratio SiO$_2$/Li$_2$O of 6.0, 25% solids by weight) | 400 | 400 |
| Ceylon graphite (50 mesh powder, 93–94% carbon) | 200 | 181.8 |
| Carbon black (Cabot grade XC-72) | | 18.2 |
| Dispersing agent (Dispersol T) | 14.5 | 14.5 |
| Distilled water | 165 | 165 | were prepared and tested as described in Example 3. The resulting dry coatings had the following resistivities:

|  | Ohms/square |
|---|---|
| Paint G | 10.0 |
| Paint H | 3.75 |

EXAMPLE 7

Two paints (I and J) having the following compositions in parts by weight:

| Paint | I | J |
|---|---|---|
| Sodium silicate solution (mole ratio SiO$_2$/Na$_2$O of 3.98, 28% solids by weight) | 155 | 155 |
| Lithium silicate solution (mole ratio SiO$_2$/Li$_2$O of 6.0, 25% solids by weight) | 226 | 226 |
| Ceylon graphite (50 mesh powder, 93–94% carbon) | 200 | 181.8 |
| Carbon black (Cabot grade XC-72) | | 18.2 |
| Dispersing agent (Dispersol T) | 14.5 | 14.5 |
| Distilled water | 184 | 184 | were prepared and tested as described in Example 3. The resulting dry coatings had the following resistivities:

|  | Ohms/square |
|---|---|
| Paint I | 7.9 |
| Paint J | 3.5 |

It can thus be seen from these Examples 6 and 7 that satisfactory electrically conductive paint coatings can be prepared using lithium silicate either alone or in admixture with sodium silicate as a binder whether the colloidal graphite be present or not. The use of lithium silicate (which is more expensive than the sodium or potassium silicate) does not, however, appear to give a lower resistivity, but it may provide a binder which is more resistant to water than sodium or potassium silicate. In addition the use of lithium silicate either alone or in admixture with sodium silicate allows one to use a silicate binder having a higher mole ratio of silica to the alkali metal oxide.

EXAMPLE 8

To show the effect of carbon black content a series of paint compositions was prepared using potassium silicate binder (mole ratio of SiO$_2$/K$_2$O of 3.89, 29.9% solids). The ratio of carbon black (XC-72) to graphite (Ceylon material below 50-mesh B.S.) was varied. In each paint composition, the dispersing agent was Dispersol T, and the compositions were milled for 4 hours in a planetary mill, the silicate binder being added after milling.

The compositions were prepared using the following components where "$x$" represents the carbon black-graphite ratio.

| | |
|---|---|
| Graphite powder | 200/$x$+1 g. |
| Carbon black | 200$x$/$x$+1 g. |
| Dispersol T | 14.5 g. |
| Water | 307.0 g. |
| Potassium silicate | 333.3 g. |

When applied to plasterboards at 50 g. dry coating weight/m.$^2$, the resistivities as shown below were found.

| $x$: | Resistivity (ohms/square) |
|---|---|
| 0 | 6.50 |
| 0.1 | 1.81 |
| 0.2 | 1.45 |
| 0.3 | 1.31 |
| 0.4 | 0.88 |
| 0.5 | 1.86 |
| 0.6 | 1.94 |
| 0.7 | 2.04 |
| 0.8 | 2.45 |

The lowest electrical resistivity was obtained at a carbon black/graphite ratio of 0.4. However, even up to 0.8 an improvement over the paint with graphite alone was still observed. Variations in "$x$" also changed the paint viscosity, and above 0.4 the brushability deteriorated, whereas it was at an optimum for values between 0.1 and 0.3.

EXAMPLE 9

Paints were prepared as in Examples 8, with various types of carbon black and values of "$x$" as defined above. The following table shows the resistivities obtained at 50 g./m.$^2$ coating weight on plasterboard.

| Grade of carbon black | Particle size (m$\mu$) | $x$ | Resistivity (ohms/square) |
|---|---|---|---|
| Black Pearls 607 | 13 | 0.1 | 3.2 |
| Regal 330 | 25 | 0.1 | 1.8 |
| Sterling SO | 41 | 0.1 | 1.7 |
| | 41 | 0.2 | 1.6 |
| | 41 | 0.3 | 1.5 |
| Sterling MTFF | 250 | 0.1 | 3.3 |
| Nil | | 0.0 | 7.8 |

Improvements in electrical conductivity compared with graphite alone are shown in each of the above cases, and it is apparent that the particular grade of carbon black to be used is not very critical when the particle size is the range found among the "furnace black" grades and other suitable carbon blacks giving similar results include those sold under the trade names Cabot XXX and Cabot Regal SRF. However, it will be noticed that higher resistivities are given when the carbon blacks are outside the range of 20 to 60 m$\mu$. (e.g. Sterling MTFF).

Similar results were found when using these grades of carbon black and using as the binder a partially organic aqueous binder of the quaternary ammonium silicate type, e.g. those sold under the trade name Quram or a totally organic aqueous emulsion as is shown by the following example.

EXAMPLE 10

Four pre-mixes I to IV were prepared by milling together for four hours on a planetary ball mill the following in parts by weight:

| Component | Pre-mix | | | |
|---|---|---|---|---|
| | I | II | III | IV |
| Graphite Avarc 202 | 200 | 166.7 | 200 | 166.7 |
| Carbon black (Vulcan XC-72) | Nil | 33.3 | Nil | 33.3 |
| Dispersing agent (Dispersol T) | 14.5 | 14.5 | Nil | Nil |
| Dispersing agent (Lissapol NX) | Nil | Nil | 12 | 12 |
| Distilled water | 357 | 357.0 | 357 | 357 |

Paint compositions were then prepared by mixing certain of these pre-mixes I to IV with certain of the following binders V to XI.

V—Revinex 10 A 40 (a carboxylated styrene/butadiene latex)
VI—Emultex F (an unplasticised polyvinyl acetate latex)
VII—Vinamul 6825 (a 75/25 vinyl acetate/2-ethyl hexyl acrylate latex)
VIII—Revacryl 144 (a styrene/acrylic latex)
IX—Vinamul 6930 (a 70/30 vinyl acetate/veova 911 latex)
X—Quram Expt. No. 5 (a quaternary ammonium silicate; $SiO_2$ percent wt. of 45%)
XI—Quram 220 (a quaternary ammonium silicate, $SiO_2$ percent wt. of 45%)

Single brushed coats of each paint were then applied to sheets of plasterboard of 12" x 14" dimensions, and when dried, aluminium foil termination of 1" width were applied to each end to give a paint film conductive area of 12" x 12". Thereafter, the electrical resistivities were measured.

The results and compositions of each paint are listed in the following table.

| Pre-mix type | Binder | | Resistivity (ohms/square) |
|---|---|---|---|
| | Type | Amount in parts by weight | |
| I | V | 110 | 17.0 |
| II | V | 110 | 3.3 |
| I | VI | 106.5 | 9.3 |
| II | VI | 106.5 | 2.4 |
| I | VII | 94 | 20.0 |
| II | VII | 94 | 3.6 |
| I | X | 117.5 | 12.3 |
| II | X | 117.5 | 3.6 |
| I | XI | 122 | 10.4 |
| II | XI | 122 | 3.5 |
| III | IX | 101 | 10.3 |
| IV | IX | 101 | 4.9 |
| IV | VIII | 105 | 5.7 |
| IV | VI | 106.5 | 4.5 |
| III | X | 117.5 | 4.0 |
| IV | X | 117.5 | 3.0 |
| IV | XI | 122 | 2.5 |

As can be seen the effect of including carbon black in the formulation greatly reduced the resistivities.

The application of a second conductive coat to the plasterboard panels reduced the resistivities of paint compositions containing the carbon black to the range of one to two ohms per square.

All the paint films were stable to heat cycling conditions. The temperature of the panels was raised to about 40° C. by the passage of sufficient current (i.e. below 5 amps), to produce an output of 35 watts per square foot. The paint films while hot, decreased by about 10 to 30% in resistance, but returned to their original values on cooling. This stability also extended to panels which had been overcoated with a non-conductive emulsion.

Paint compositions according to the invention can also be made using an organic solvent soluble resin as binder to give films of low resistivity at 0.002 to 0.003 inch coating thickness. The addition of a dispersing agent to the organic solvent based systems, although desirable from the point of paint appearance and flow properties, was not always necessary since the resins themselves may also function as dispersing agents.

These paint compositions are illustrated by the following Example 11.

EXAMPLE 11

Five paint compositions K to O were prepared by planetary milling together various components in various orders for various milling times. In all cases an epoxy-ester binder was used which was Synolac 400W (60% resin in white spirit). To the resulting paint compositions were added 2 g. of cobalt naphthenate drier solution (6% cobalt content), the paint compositions were then applied to plasterboard and the electrical resistivities of the dried films measured.

| Component | Paint composition | | | | |
|---|---|---|---|---|---|
| | K | L | M | N | O |
| Epoxy-ester (g.) | 87.5 | 87.5 | 87.5 | 87.5 | 87.5 |
| Graphite (Avarc 202) (g.) | 166.7 | 166.7 | 166.7 | 166.7 | 166.7 |
| Carbon black (XC-72) (g.) | 33.3 | 33.3 | 33.3 | 33.3 | 33.3 |
| White spirit/xylene (ml.) (50/50 mixture) | 600 | 600 | 600 | | |
| Copper oleate (g.) | | 11 | | | |
| Duomeen TDO. (g.) | | | 11 | 5 | 5 |
| Cellosolve/xylene (3/1 mixture) (ml.) | | | | 600 | 600 |
| Milling time (hours) | 4 | 4 | 4 | 5 | 5 |
| Epoxy-ester added before or after milling of graphite | (¹) | (¹) | (¹) | (²) | (¹) |
| Electrical resistivity (ohms/square) | 6.8 | 7.9 | 9.4 | 6.6 | 6.4 |

¹ Before.
² After.

As can be seen low resistance films were provided.

These paint compositions were rather viscous and it was found that better flow properties were obtained by reducing the p.v.c. from 65% to 47%, increasing the carbon to graphite ratio and adding Rosaniline base as the dispersing agent. This is illustrated by the following Example 12.

EXAMPLE 12

Two paint compositions (P and Q) were prepared from the following components:

Epoxy-ester (Synolac 400W) _____g__ 87.5
White spirit/xylene (50/50 mixture) _____ml__ 350
Carbon black (XC-72) _____g__ 33.3
Dispersing agent (Rosaniline base) _____g__ 1.0

These were planetary milled for 1 hour, then to both paints 66.7 g. of Avarc 202 graphite was added and 3 hours further milling completed.

The two paint compositions produced were free flowing thin paints, with application properties equal to aqueous based paints. We believed that this was mainly due to the dispersing agent, Rosaniline base, which is a preferred dispersing agent for colloidal carbon particles and graphite in organic solvents.

Rosaniline was used in two ways. For paint composition P, the Rosaniline was heated to 190° C. with the epoxy-ester for 15 minutes before grinding and it is believed some chemical reaction occurs as the base changes colour and its dispersing efficiency is improved. With paint composition Q, the Rosaniline base was dissolved in the resin at only 100° C. before milling and it was found that this composition was more viscous than composition P.

The paint compositions were applied to plasterboards as before and the coating weight recorded. The electrical resistance was measured and results calculated for a coating weight of 100 g./m.², this being equivalent to a film of about 0.002 in thickness. The electrical resistances were:

Paint composition     Resistance for 100 g. coating/m.² (ohms/square)
P _____ 7.4
Q _____ 6.9

EXAMPLE 13

Eight paint compositions R to Y were prepared by planetary milling together various components as set out below. In the case where carbon black (XC-72) was incorporated this was predispersed for 2 hours before the graphite (Avarc 202) was added. After the addition of the graphite all paint compositions were milled for 4 hours. After preparation, paint compositions were applied to plasterboard and the electrical resistivities of dried films measured and results calculated for a coating weight of 100 g./m.$^2$. Where the binder was an alkyd/melamine binder, the films were cured by heating in an oven to 125° C. for ½ hour.

Although these compositions were based on organic solvents, the final binder upon complete curing is only silica. In this way they produce temperature resistant coatings comparable with aqueous silicate binders.

Oil-modified alkyd resins can serve as binders as shown by the following example.

EXAMPLE 16

Four paint compositions $C^1$ to $F^1$ were prepared by predispersing on a planetary mill carbon black (XC-72) in the binder for one hour followed by addition of the graphite (Avarc 202) and milling for a further 3 hours. In all compositions the carbon to graphite rates was 0.5

|  | Paint composition | | | | | | | |
| --- | --- | --- | --- | --- | --- | --- | --- | --- |
|  | R | S | T | U | V | W | X | Y |
| Polymethacrylic ester, 40% solution (Bedacryl 122X) (g.) | 131 | 131 | 131 | 131 |  |  |  |  |
| Xylene (ml.) | 500 | 500 | 500 | 500 |  |  |  |  |
| Carbon black (g.) | 33.3 | 16.7 |  |  | 33.3 | 16.7 |  |  |
| Graphite (g.) | 166.7 | 83.3 | 200 | 100 | 166.7 | 83.3 | 200 | 100 |
| Non-drying caster oil alkyd resin (60% solids) (g.) |  |  |  |  | 65 | 65 | 65 | 65 |
| Butylated melamine-formaldehyde resin (60% solids) (g.) |  |  |  |  | 21.8 | 21.8 | 21.8 | 21.8 |
| Xylene n-butanol (3/1 mixture) (ml.) |  |  |  |  | 600 | 600 | 600 | 600 |
| P.v.c. (percent) | 65 | 47 | 65 | 47 | 65 | 47 | 65 | 47 |
| Carbon black/graphite | 0.2 | 0.2 | Nil | Nil | 0.2 | 0.2 | Nil | Nil |
| Resistivity (ohms/square) | 3.0 | 2.4 | 9.5 | 18.0 | 3.9 | 3.0 | 6.8 | 6.1 |

As can be seen the inclusion of carbon black in the formulation greatly reduced the resistivities and also a low resistance film is obtainable at a reduced p.v.c.

EXAMPLE 14

An asbestos panel 10″ x 8″ was sealed by two copious coats of partially hydrolysed ethyl silicate, the surface after drying being consolidated and glossy. A thick film of paint composition W of Example 13 was then applied, and the solvents allowed to evaporate at room temperature. Aluminium foils were attached and the electrical resistance measured before heating was found to be 6 ohms.

An electric current was passed through the film, and when the surface temperature reached about 125° C. constant temperature was maintained by the passage of 4 amps from a 13 v. supply for 2 hours.

The final resistance of the cold film was found to be 3.2 ohms. An advantage of this process is that such stoving paint compositions may be cured by electrical heating "in situ" rather than by the use of a conventional stoving oven.

EXAMPLE 15

Electrically conductive paint compositions were prepared based on hydrolysed ethyl silicate binder, the binder solution employed being supplied by the Stauffer Chemical Co. under the grade name Silbond H6 having a SiO$_2$ content of 18%.

Paint compositions $A^1$ and $B^1$ were prepared by milling the following in a planetary mill for 4 hours:

| Component | $A^1$ | $B^1$ |
| --- | --- | --- |
| Graphite powder (<50 mesh B.S.) (g.) | 200 | 166.7 |
| Carbon black (Cabot XC-72) (g.) |  | 33.3 |
| Isopropanol (ml.) | 300 | 300 |
| Silbond H6 (g.) | 100 | 100 | followed by adding a further 455 g. of Silbond H6. In each paint composition the ratio of total carbon pigments to silica was 2:1 by weight. Free flowing paints of low viscosity were obtained.

Paint coatings were applied to plasterboard test panels as before, and when dry their electrical resistances were determined and corrected to a coating weight of 100 g./m.$^2$ with the following results:

| Composition: | Resistance (ohms/square) |
| --- | --- |
| $A^1$ | 17.6 |
| $B^1$ | 8.8 | at a p.v.c. of 47%. After milling, 2 g. of cobalt naphthenate drier solution (6% cobalt content) were added and the paint composition applied to plasterboard. The electrical resistivities of the dried film were measured and corrected to a coating weight of 100 g./m.$^2$.

|  | Paint composition | | | |
| --- | --- | --- | --- | --- |
| Component | $C^1$ | $D^1$ | $E^1$ | $F^1$ |
| Linseed/pentaerthritol long oil alkyd binder (Paralac 10) (g.) | 52.5 | 52.5 |  |  |
| Carbon black (g.) | 33.3 | 33.3 | 33.3 | 33.3 |
| White spirit/xylene (50/50 mix) (ml.) | 400 | 350 |  |  |
| Rosaniline base preheated with resin to 190° C. (g.) | 1.0 |  | 1.0 |  |
| Rosaniline base (dissolved in resin at 100° C.) (g.) |  | 1.0 |  | 1.0 |
| Graphite (g.) | 66.7 | 66.7 | 66.7 | 66.7 |
| Medium oil length linseed/tung glycerol alkyd binder (Paralac N18X) (g.) |  |  | 87.5 | 87.5 |
| Xylol (ml.) |  |  | 450 | 300 |
| Electrical resistivity (ohms/square) | 7.3 | 4.9 | 6.4 | 4.1 |

These four paint compositions were similar to those of Example 12.

I claim:

1. A method of making an electrically conductive paint composition in which graphite is comminuted by wet grinding so as to reduce the graphite to the form of thin platelets by laminar cleavage, and incorporating the graphite in an air-hardenable binder, the mixture of comminuted graphite and binder having a paint-like consistency and having a pigment volume concentration of 25–75% of comminuted graphite and being capable of being brushed or sprayed so as to give a thin even film of low electrical resistance on a surface.

2. A method as claimed in claim 1 in which the graphite is wet ground in the presence of a surface active agent.

3. A method as claimed in claim 1 in which colloidal size carbon particles of a size of from 20 to 60 millimicrons are incorporated.

4. A method as claimed in claim 3 in which the colloidal size carbon particles are mixed with the binder before the latter is mixed with graphite.

5. A method as claimed in claim 4 in which the colloidal size carbon particles are milled with the binder the graphite is added and wet ground in the binder.

6. A method as claimed in claim 3 in which the graphite is wet ground in a solvent for the binder together with the colloidal size carbon particles and the binder is thereafter added to the ground mixture.

7. A method as claimed in claim 1 in which the graphite is wet ground in at least a part of the binder.

References Cited

UNITED STATES PATENTS 3,035,955  5/1962  Zucker et al. ------ 252—511
3,404,019  10/1968  Gotshall ---------- 23—209.2

OTHER REFERENCES

Tawner, "Castable Conductive Plastics," Soc. of Plastic Engineers, March 1959, pp. 216–219.

DOUGLAS J. DRUMMOND, Primary Examiner

U.S. Cl. X.R.

23—209.2; 117—216